United States Patent [19]

Barrett

[11] 4,406,099
[45] Sep. 27, 1983

[54] UNITIZED FLOOR PANEL AND METHOD OF LAYING THE SAME

[76] Inventor: Lawrence G. Barrett, 3223 Downing Dr., Lynchburg, Va. 24503

[21] Appl. No.: 160,509

[22] Filed: Jun. 18, 1980

[51] Int. Cl.³ .............................................. E04F 13/08
[52] U.S. Cl. .................................. 52/127.3; 52/173 R; 52/388
[58] Field of Search .................. 52/173 R, 127, 388, 52/389, 390, 391

[56] References Cited

U.S. PATENT DOCUMENTS

| | | |
|---|---|---|
| 602,691 | 4/1898 | Alexander . |
| 706,874 | 8/1902 | Alcan .................... 52/388 |
| 738,704 | 9/1903 | Semmer ................. 52/388 |
| 1,994,644 | 3/1935 | Harshberger . |
| 2,020,455 | 11/1935 | Butler .................... 72/22 |
| 2,836,290 | 5/1958 | Braun .................... 206/56 |
| 3,077,059 | 2/1963 | Stout . |
| 3,535,839 | 10/1970 | Strübing ................ 52/97 |
| 3,579,410 | 5/1971 | Barrett .................. 52/390 |
| 3,589,507 | 6/1971 | Greenberg ........... 206/47 |
| 3,808,032 | 4/1974 | Bosco .................... 117/72 |
| 3,908,053 | 9/1975 | Hettich .................. 428/44 |

FOREIGN PATENT DOCUMENTS

| | | |
|---|---|---|
| 703861 | 2/1965 | Canada ................... 52/390 |
| 21261912 | 12/1972 | Fed. Rep. of Germany ........ 52/515 |
| 2345594 | 3/1975 | Fed. Rep. of Germany ........ 52/390 |
| 1041259 | 10/1953 | France . |
| 219072 | 1/1942 | Switzerland . |
| 297763 | 4/1954 | Switzerland ........... 52/388 |
| 787169 | 12/1957 | United Kingdom . |
| 825122 | 12/1959 | United Kingdom ........ 52/389 |
| 1127013 | 9/1968 | United Kingdom ........ 52/105 |

Primary Examiner—Price C. Faw, Jr.
Assistant Examiner—Henry E. Raduazo
Attorney, Agent, or Firm—Sandler & Greenblum

[57] ABSTRACT

A unitized floor panel is formed having at least one row comprising a plurality of unattached wooden tiles assembled in generally abutting relation. A layer of pressure sensitive adhesive covers at least a portion of the upper surface of the tiles and is in turn covered by a flexible and removeable support and protective sheet which covers the adhesive and tiles. The adhesive bond formed between the sheet and the adhesive is stronger than the bond formed between the adhesive and the tile so that the sheet and adhesive can be easily stripped from each panel when desired. The wooden tiles can either be finished or unfinished and can be formed from acrylic wood tiles arranged in parquet fashion. The cover sheet is preferably formed from either transparent plastic film or paper having a printed design corresponding to the design and arrangement of the tiles onto which it is positioned. The sheet can include perforations to control cure rate of the sub-flooring adhesive onto which the panels are placed. A method of laying these panels includes preparing the sub-floor onto which the panels are to be placed, spreading adhesive between the panels and the sub-floor, placing the panels onto the sub-floor and applying pressure onto the panels so that they generally conform to the sub-floor before self-levelling occurs. After the panels are placed and pressed onto the sub-floor the adhesive layers and flexible sheet may be stripped away from the upper surface of the panels thereafter without using water or other preparations when desired.

19 Claims, 9 Drawing Figures

UNITIZED FLOOR PANEL AND METHOD OF LAYING THE SAME

BACKGROUND OF THE INVENTION

1. Field of the Invention

The present invention generally relates to a unitized floor panel and a method of laying the same on a subfloor, and more particularly to a unitized floor panel which comprises a plurality of unattached wooden tiles assembled in generally abutting relation and which are carried and protected by an easily removable sheet which is adhered to the upper surface of the tiles.

2. Discussion of Prior Art

In recent years the use of parquet flooring and similar wooden tile arrangements has substantially increased. The parquet floors are assembled in various ways. One method comprises assembling a plurality of wooden slats into small tiles which are held together by wires, splines, or webbing positioned along their bottom surfaces. These connecting members are placed on the bottoms of the tiles so that they will not be seen when the floor is installed. These subpanels have been assembled into larger arrangements either by connecting them mechanically, e.g. tongue and groove or spline joint, or by covering a number of slats by a sheet of paper which is adhered to the top surface of the assembly. In the latter arrangements, the adhesive used must be soluble so that after the floor panel has been installed and the mastic used to secure the floor panel to the subfloor has been partially cured the paper cover sheet can be removed from the installed panels by wetting the paper. After the paper is removed, it is then necessary to sand the floor and apply the desired stains, sealers, coatings and wax to finish the same. Only unfinished wooden panels have been formed in accordance with this method. No carrier and protective sheet has been utilized to hold the panels together as a fully prefinished tile assembly, and none has been used which is easily stripped from the upper surface of the tiles.

A second method of assembling individual tiles into a panel comprises adhering a foam backing sheet to the bottom of tiles which are joined by a tongue and groove connection. The bottom of the form backing is then covered with spots of adhesive onto which a release paper layer is attached. Prior to use, the paper layer is stripped from the foam backing and the adhesive on the bottom of the foam secures the assembly to a floor.

A third method of forming an assembly of tiles has been used which comprises placing a hot melt adhesive on the underside of the panels at the joints where the tiles abut one another to form a unitized panel. No protective or carrying sheet is used with such an assembly of tiles.

A number of patents disclose various other ways of holding a plurality of tiles together.

LENZLINGER, Swiss Pat. No. 219,072, discloses parquet flooring material 1 held together by cover 2 adhered to the upper surface of the parquet material. The cover layer is fabric or woven material connected to the parquet by an adhesive which is removed only after the adhesive on the sub-floor into which the parquet is placed has hardened and the floor is in its finished state.

GUILLAUME, French Pat. No. 1,041,259, discloses wooden flooring having a layer of mastic and reinforced latex glue on its underside for holding a plurality of panels together. An upper layer of paper is adhered to the upper surface of the wooden flooring by means of sticky paper or tape placed about the edges of the cover sheet. The cover sheet is not adhered to the wooden panels.

KRAUS, German Pat. No. 2,126,192, discloses means for applying a protective covering to steps, walls and flooring which comprises a strippable paper pre-impregnated with adhesive.

MONK, British Pat. No. 787,169, discloses a wooden floor held together along its top surface by a tough paper sheet. The tough paper sheet is secured to the wood by a water-sensitive adhesive and is removed by moistening the paper prior to stripping it from the floor.

BOSCO, U.S. Pat. No. 3,808,032, discloses a unitary panel comprised of a plurality of tiles. The integral panel is formed by bonding the individual tiles by suitable fastening means.

STOUT, U.S. Pat. No. 3,077,059, discloses a brick veneer panel having a conventional webbing along its rear surface. A plurality of brick slabs are attached to the panel and separated by spaces adapted to receive grout. Protective sheets are utilized as covers for the outer surfaces for each of the brick slabs and are moved only after the grout has been placed in the spaces and has dried.

STRUBING, U.S. Pat. No. 3,535,839, discloses structure for attaching a plurality of sealed tiles on their undersides. The tiles are attached by a plurality of flexible tapes or strips formed from paper, plastic or other material.

HETTICH, U.S. Pat. No. 3,980,053, discloses a finished parquet having an elastic foundation on the underside of the attached parquet elements.

ALEXANDER, U.S. Pat. No. 602,691, discloses tiling structure for embedding a plurality of small tiles into cement or other binding material. The tiling includes a sheet covering the tile disks with an adhesive substance. The sheet is removed after the individual tiles are firmly set into cement.

BUTLER, U.S. Pat. No. 2,020,455, discloses a tile assembly which can be placed on a floor or wall as a unit rather than as individual tiles. A removeable cover is provided for holding the tile assembly together and is separated from the tiles once they have been set into cement on a wall, ceiling or other building area.

HARSHBERGER, U.S. Pat. No. 1,994,644, discloses a plurality of plastic blocks set onto a backing or webbing formed of flexible or ridged mesh. A flat adhesive covering is placed over the outer surface of the blocks until binding material or grout is placed between the blocks and has set.

GREENBERG, U.S. Pat. No. 3,589,507, discloses a kit for putting mirrors and similar plates onto walls. This kit includes removeable indicia positioned upon the front surface of the panels so that a worker will see the proper position in which the individual plates should be placed.

None of these prior art arrangements, however, discloses a unitized floor panel which has a layer of pressure sensitive adhesive material covering the upper surface of a plurality of unattached wooden tiles and a flexible, removeable support and protective sheet which covers the adhesive and which is stripped together with the adhesive from the floor panel. Nor do any disclose means for controlling the cure rate of adhesive on the sub-floor onto which the panels are placed.

SUMMARY OF THE INVENTION

Accordingly, it is a general object of the present invention to provide a new and improved unitized floor panel and method of laying the floor panel.

Another object of the present invention is to provide a new and improved unitized floor panel which minimizes the labor required and the necessary time for laying a floor.

A further object of the present invention is to provide a new and improved unitized floor panel which will reduce the number of tile panels required for a predetermined floor area by producing panel assemblies larger than those previously available.

Still another object of the present invention is to provide a new and improved unitized floor panel which is foldable upon itself to facilitate packaging and storage of a relatively large sized panel.

An additional object of the present invention is to provide a new and improved unitized floor panel which has an upper surface which assists a workman in cutting the unitized panel to form it into a configuration conforming to the floor onto which the panels are laid.

A more particular object of the present invention is to provide a new and improved unitized floor panel which has an upper layer strong enough to carry a plurality of the tiles and easily removeable from the upper surface of the tiles when desired to provide an attractive floor surface.

A still further object of the present invention is to provide a new and improved unitized floor panel which has an upper layer which serves to raise all of the tiles forming the floor panel to a generally uniform level prior to the curing of adhesive on a sub-floor into which the panels are laid.

Yet another object of the present invention is to provide a new and improved unitized floor panel having an upper layer which helps control the rate of cure of adhesive or mastic onto which the panels are positioned.

A still further object of the present invention is to provide a new and improved method of laying unitized floor panels in which workers can lay adhesive ahead of their direction of progress.

Still another object of the present invention is to provide a new and improved unitized floor panel which has an upper protective surface for preventing water, dirt and other undesirable materials from contacting the upper surface of the tiles until a predetermined time, e.g. the time at which a new building opens for business.

Yet a further object of the present invention is to provide a new and improved method of laying a unitized floor panel in which the amount of finishing type work which must be performed on panels after they are set onto a sub-floor is eliminated or minimized.

Upon study of the specification and appended claims, further objects, features and advantages of the present invention will become more fully apparent to those skilled in the art to which this invention pertains.

BRIEF DESCRIPTION OF THE DRAWINGS

The above and other objects, features and advantgages will become more apparent to those of ordinary skill in the art to which this invention pertains from the following detailed description, when considered in connection with the accompanying drawings, in which like reference characters designate like or corresponding parts throughout the several views and wherein.

DETAILED DESCRIPTION OF THE DRAWINGS

Figure 1:
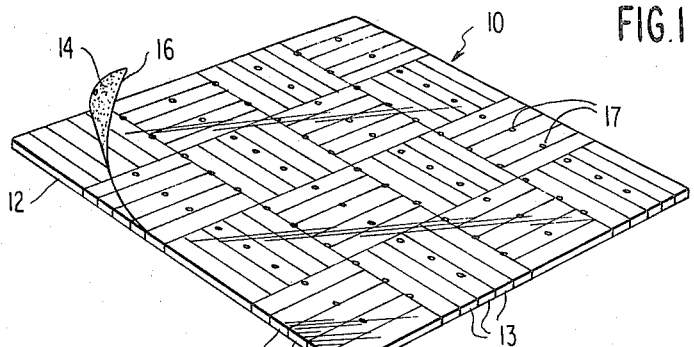
FIG. 1 is a perspective view of a unitized panel having a transparent cover sheet formed in accordance with the present invention.

With specific reference to FIG. 1, a unitized panel 10 formed in accordance with the present invention is disclosed. Each unitized panel consists basically of three layers: a base or lower layer formed of a plurality of generally unattached wooden tiles 12 assembled in abutting relationship; an upper carrier, support and protective cover sheet 16 which is substantially coextensive with the base layer; and an intermediate layer of pressure sensitive adhesive 14.

Figure 2:
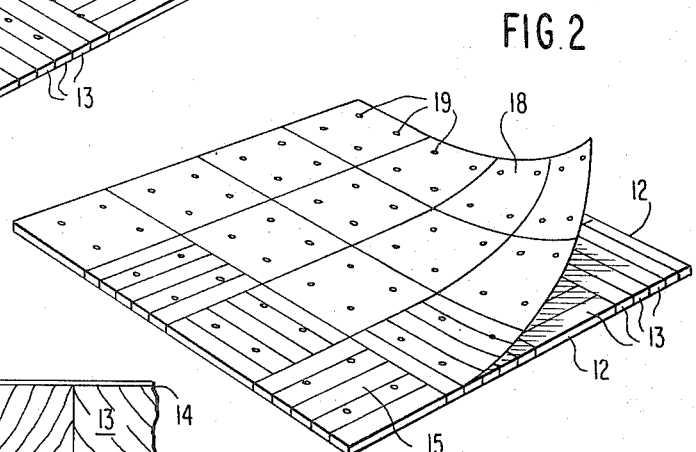
FIG. 2 is a perspective view of a unitized panel formed in accordance with the present invention having a paper cover sheet marked with indicia.

Each tile 12, although shown as being comprised of a plurality of assembled slats 13, may comprise any wooden tile used as a flooring product. The tiles in FIGS. 1 and 2 are shown as arranged in parquet fashion, but the present invention is equally applicable to all other wood flooring products. The wood used is not limited to unfinished and unsanded wooden tiles, but may include presanded wood which has been finished for smoothness and other finished wooden products. The upper surface of the blocks, when sanded and finished, provide a better contact for the pressure sensitive adhesive 14 and enhance the carrying and support characteristics of cover sheet 16 or 18.

The wood may also be finished by any conventional finishing product, e.g. linseed oil, tung oil, polyeurethanes, veneers and shellacs. This is advantageous in that previous unitized panels, which used a water soluble adhesive, required a great deal of finishing work after the cover sheet was removed; such panels could not use prefinished blocks due to the damage that the sheet removal operation would cause to the upper surface of the wooden tiles.

Acrylic/wood or other wood-plastic composite tiles can also be used rather than natural wood tiles alone. One example of these tiles is illustrated in applicant's previous U.S. Pat. No. 3,579,410. Such acrylic tiles may comprise a plurality of wooden slats which are attached together along their rear surface by a wire placed within adjacent recesses on the slats.

Figure 6:
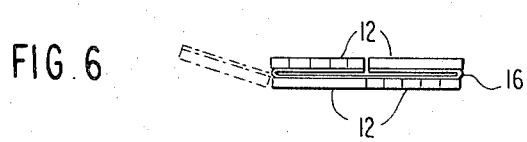
FIG. 6 illustrates in solid lines a panel formed in accordance with the present invention being folded upon itself for storage and handling in compact fashion and in dashed lines one of the tile rows being unfolded from the compact position.

As illustrated, the wooden tiles are joined into a unitary panel only by the cover sheet and adhesive, but other arrangements are also possible. Although a butt joint is shown in the drawings, a tongue and groove connection between adjacent wooden tiles could be utilized to better secure them to one another, as could a conventional spline joint. Such a connection, however, would have a slight retarding effect upon curing of the adhesive 22 on the upper surface of the sub-floor onto which these panels are placed, as will be discussed hereinafter. By forming the tiles with butt joints in a generally unattached fashion, it is possible to fold the panel into a compact storage or transport position, as illustrated in FIG. 6. In this fashion, for panels which include four rows of tiles, as illustrated in FIGS. 1 and 2, the two outer rows of tiles can be folded upon the two intermediate rows such that a portion of cover sheet 16 is folded upon itself; as a result, the folded panel has a width of approximately one half the original width of the unfolded panel. This makes it easier to transport and package the unitized panels. When it is desired to unfold the panel for either further processing or placement onto a sub-floor, each row of tiles which is folded upon the intermediate rows is unfolded as illustrated by the dashed lines in FIG. 6. Although when the panels are folded, portions of the adhesive contact between cover sheet 16 and tiles 12 are lost, i.e. as with the outer curved portions of the cover sheet shown in FIG. 6, the lost contact portions are small in comparison to the remaining contact portions of the tiles to the sheet so that the protective and support features of the sheet are not disturbed to a significant degree. The use of a butt joint is also advantageous when it is desired to place the unitized panels on a cylindrical or hexagonal roll, as such joints enhance the flexibility of the panel and enable it to easily bend and/or fold without cracking or breaking.

The surface finish of the wooden tiles assembled can be important regardless of whether the tiles are wood only or acrylic/wood. Fully sanded and prefinished tiles adhere better to the pressure sensitive adhesive coated cover sheet than on those tiles which are only sanded or which are unsanded and have no finishing material thereon.

Adhesive 14 is preferably a pressure sensitive adhesive, e.g. an acrylic adhesive, and must be compatible with the upper surface of the tile so as not to mar or damage such wooden surface. The adhesive must provide satisfactory bonding between the cover sheet and the tiles. It need be a strippable adhesive, it is required to have a stronger bond to the cover sheet, be it plastic sheet 16 or paper sheet 18, than to the tiles, so that it will strip clean with the cover sheet when such sheet is pulled or peeled away from the assembled tiles. The adhesive is further required to hold up in storage in warehouses and should not flow under these conditions. The pressure sensitive adhesive can be preapplied to the underside of the cover sheet used or can be purchased separately and then applied to the underside of the cover sheet.

The pressure sensitive adhesive preferably has a high shear strength to prevent failure of the bond between the tiles and the cover sheet while the panels are carried from their packages to the selected floor area for installation, and should have sufficiently low peel strength to facilitate later removal of the cover sheet and adhesive from the installed floor panel.

The upper layer of the unitized panel comprises a carrier, support and protective plastic cover sheet 16, as illustrated in FIG. 1, or paper cover sheet 18, as illustrated in FIG. 2. Cover sheet 16 is formed from a transparent or translucent plastic film. A plastic film having high tensile strength, low creep, high abrasive resistance and low elongation is desirable, e.g. four mil low density polyethylene film can be used. As discussed above, the film may either come with preapplied adhesive or the adhesive 14 can be applied to the film. The film used will have low flammability so that in the event of a fire it will melt on the upper surface of tiles 12 and can then be removed by buffing.

The plastic film is preferably highly resistant to abrasion to enhance its protective effect until it is ready for use. At that time the plastic film can be stripped from the tiles, together with the pressure sensitive adhesive, due to the relatively stronger bond between the pressure sensitive adhesive 14 and cover sheet than that between the adhesive and tiles. The upper surface of the tiles need then only be buffed to remove dust that may have entered through the perforations to provide an attractive, finished appearance.

Cover 16 includes a plurality of spaced perforations or apertures 17. These apertures are provided for assisting in the controlled release of solvent from the adhesive on the sub-floor onto which these panels are to be placed. Without apertures, the curing of such adhesive, i.e. the release of such solvents, will be retarded and will be on the order of 1 to 10 days. This may create an intolerable situation because one of the major purposes of the cover sheet is to protect the upper surface of the panels after they have been laid. With the present panel, the cover sheet remains on the panels while laborers perform all of the other necessary operations in the building in which the panels are laid. During this time the cover sheet protects the tiles from dirt, water and other undesirable substances, which would naturally otherwise accumulate on the upper surface of the panel. At the same time, cure of the sub-floor adhesive is being inhibited. It is therefore necessary to provide a means, i.e. the perforations, for allowing the adhesive onto which the panels are placed to cure while still protecting the panels. Additionally, the presence of perforations helps to eliminate the presence of bubbles which might otherwise appear due to air which is trapped between the cover sheet and the upper surface of the tiles.

The size and number of the perforations depends upon the rate of cure which is desired for the sub-floor (second) adhesive 22 onto which the panels are placed when the floor is being laid. The perforations can be microporous or sufficiently large so as to be visible. Of course, the larger the apertures and perforations are, the less of a protective effect the cover sheet will have. Because the size of the perforated area determines the rate of solvent evolution into the atmosphere, the area provided for the perforations will control the adhesive cure rate which is required in any given situation.

Placement of the perforations closer to the abutting edges of the blocks and individual slats, where that type of flooring is used, will result in a quicker cure. If a slower cure is desired for any reason, placement of the apertures away from these joints or edges would be advantageous. Again, the greater the area occupied by these perforations, the smaller the carrying, support and protective effects will sheets 16 or 18 have.

The perforations are only necessary when the mastic or other adhesive having solvent as a portion thereof is used. When an epoxy resin is utilized as sub-floor adhesive 22, the perforated holes need not be provided in the cover sheet because there is no problem with solvent having to vaporize into the atmosphere, and accordingly no advantage in utilizing apertures to control a cure rate.

The adhesive need not be continuous over the entire surface of the cover sheet (nor therefore, over the upper surfaces of the tile), but can be placed in strips or other smaller portions as long as enough adhesive is present enable the support and carrier sheet to have its desired characteristics.

Figure 3A:
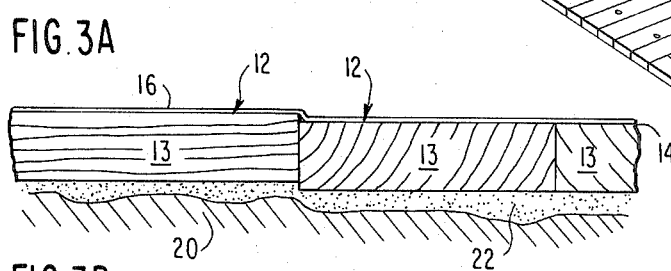
FIGS. 3A, 3B, and 3C are cross sectional views of the unitized panel of FIG. 1 after it has been initially placed on a sub-floor covered with adhesive, after the cover sheet has raised the individual tiles substantially to the same level and after a second rolling and self levelling process has occurred, respectively.
Figure 3B:
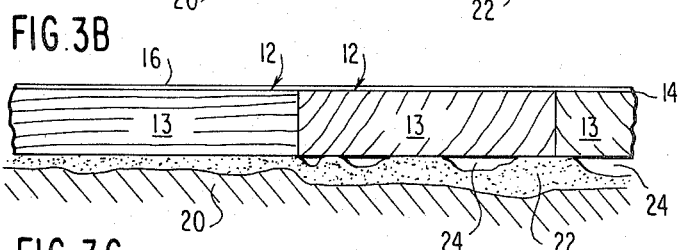
Figure 3C:
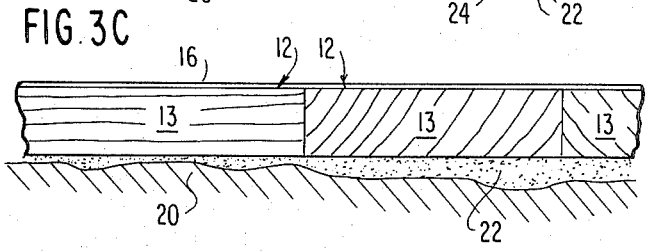

One of the advantages of controlling the rate of cure of adhesive 22 is to control the open time necessary for the adhesive to rework itself, which provides a self levelling characteristic of the unitized panels. This feature is best illustrated in 3A, 3B and 3C. Once the unitized panels are placed on sub-floor 22, as illustrated in FIG. 3A, they are rolled to better conform to the upper surface of the sub-floor and its irregularities. Over a period of time, cover 16 (or 18 if paper is used), will serve to pull the upper surfaces of all of the tiles 12 into substantial alignment, as illustrated in 3B. This can occur only before adhesive 22 had fully cured, i.e. while it can still be stretched, and serves to provide an even flooring surface even where the sub-floor has an irregular upper surface. Spaces 24 are created between adhesive 22 and the lower surface of tiles 12, as illustrated in FIG. 3B, due to this initial levelling effect created by the cover sheet raising the tiles. The panels are then again rolled and final curing of adhesive 22 takes place. After the second rolling, the self levelling affect caused by the cover sheet again occurs, and the final panel position is illustrated in FIG. 3C, in which most of recesses 24 have been eliminated and the upper surfaces of tiles 12 are substantially aligned.

If desired, the cover sheet can be formed from paper, as cover sheet 18. While Kraft or butcher paper can be utilized, since both of these are opaque materials, it is necessary to provide the upper surface of paper 18 with printing, as evidenced by indicia 15. These indicia correspond to the pattern of the flooring tiles arranged on each panel 10 and enable a workman to place adjacent panels 10 in the proper position on a sub-floor without requiring removal of the cover sheets. This is achieved with a plastic sheet due to the transparent or translucent nature thereof. Additionally, the transparent nature of the plastic and the printing on the paper cover sheets facilitates correct cutting of panels 10 when necessary, as will be described hereinafter with regard to the method of laying these panels. Cover sheet 18 can include perforations 19 having the same purpose as perforations 17 on plastic cover sheet 16.

Either of the cover sheets can be provided with a tear tab, tear strip or other conventional tear or stripping initiation means for facilitating the removal of the strippable cover sheet from the assembled tiles.

By using these unitized panels, panels of at least 1 foot by 1 foot can be used, whereas previously, panels of 6 inches by 6 inches had to be laid individually. In this fashion, an installation rate of 3 to 5 times as many square feet can be laid in an 8 hour per individual workman. Therefore, the number of individual panels which must be laid for a given square foot area is drastically reduced.

The method of laying the unitized panels is illustrated in FIGS. 4A, 4B, 5 and 6. As discussed above, FIG. 6 illustrates in solid lines the position of the panel in its packaged, compact state. To begin laying these panels they must be opened into their flat condition, as illustrated in FIGS. 1 and 2.

Figure 4A:
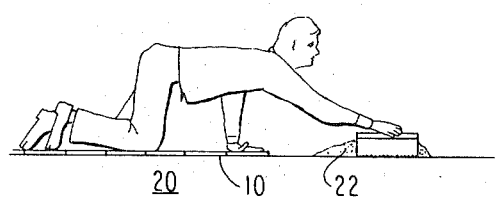
FIGS. 4A and 4B illustrate a method of laying unitized panels in accordance with the present invention by placing adhesive ahead of the direction in which a worker is laying the panels.
Figure 4B:
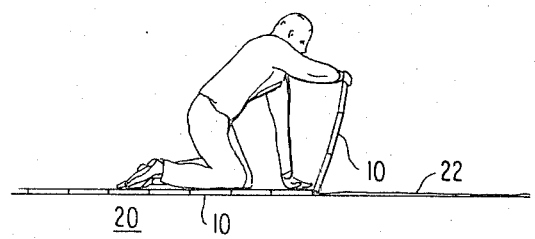

Sub-floor 20 must first be prepared, which includes cleaning the sub-floor to remove dust and other coatings which prevent or harm the bond between sub-floor adhesive 22 and the underside of tiles 12 from the sub-floor. Once the sub-floor has been cleaned, adhesive is spread between the unitized panels and the sub-floor. This can either be done by field or factory application of the adhesive to the underside of panels 10 or the spreading of adhesive 22 directly onto sub-floor 20. As illustrated in FIGS. 4A and 4B, use of panels 10, with their protective cover sheets, enables one or two workman to lay adhesive ahead of the tiles in the direction in which they are working. Adhesive is first trowelled onto sub-floor 20 while a workman sits, kneels or stands on previously laid panel 10 or by a second workman positioned ahead of the installer. The upper protective sheet 16 or 18 prevents any harm to the finish of the tiles due to dirt or other materials which might damage the finish. After laying the adhesive and removing the folded panels from their packages, each panel can be laid down on the sub-floor under manual pressure, as illustrated in FIG. 4B. A further advantage of the flexible nature of the butt joint between adjacent tiles 12, described hereinabove, is that each row of tiles which comprise a portion of panel 10 can be placed down adjacent to the last row of tiles which has been laid. This enhances the alignment of the panels and the overall appearance of the flooring when it is completed.

After the panels have been laid, a first rolling of the tiles is performed, as described above and shown in FIG. 3A. After waiting for a predetermined period of time, dependent upon the rate of cure of adhesive 22, for the cover sheet to raise the upper surfaces of all of the tiles to a substantially uniform level, a second rolling of the tiles is performed. With temperature sensitive epoxy adhesive utilized as adhesive 22, only one rolling of the panels is required.

The time for rolling can be determined on the job, dependent on the rate at which the solvent from adhesive 22, where present, evaporates into the atmosphere.

The cover sheet is left attached to tiles 12 while other work is performed in the areas in which the panels have been laid. This protects the upper surface of the tiles from paint, water, dirt and all other construction materials, as well as from scuff marks and similar damage to the tiles. Before the store is opened, the cover sheets are simply stripped with the pressure sensitive adhesive from tiles 12 by pulling them away. If any dirt has accumulated on the upper surface of the panels, due to the presence of perforations 17 or 19, buffing may be required to restore luster to the surfaces. No other finishing steps are necessary.

Figure 5:
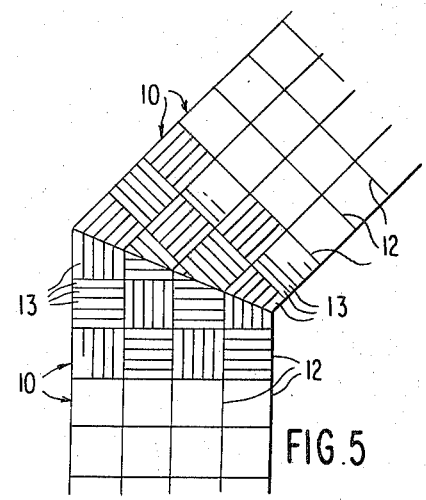
FIG. 5 illustrates a plurality of the panels of the present invention placed on a floor which has a 45 degree angle elbow portion.

Boundary or feature strips or other subassemblies which complement the unitized panels can be placed around the periphery of the area in which the panels are laid or intermediate two panels. Additionally, as illustrated in FIG. 5, the unitized panels can be cut if necessary to allow them to be laid in an area having an elbow or angled portion. The 45 degree angle portion shown in FIG. 5 requires the panels to be cut across their diagonals. For this reason, transparent or translucent plastic cover sheet 16 is preferred, as a laborer can cut across the diagonal of a large unitized panel 10 and see exactly what he is cutting, without the necessity of removing the cover sheet. Although this can also be achieved with the indicia placed on top of paper sheet 18, such will generally not be an exact representation of the area of the panel which is being cut.

After the panels have been laid and the cover sheets stripped therefrom, the unitized panels of the present invention present a very attractive flooring surface which requires little, if any, additional work in order to provide a ready to use floor surface.

From the foregoing description, one skilled in the art can easily ascertain the essential characteristics of this invention and, without departing from the spirit and scope hereof, can make various changes and modifications of the invention to adapt it various uses and conditions.

What is claimed is:

1. A unitized floor panel comprising:
   (a) at least one row comprising a plurality of unattached wooden tiles assembled in generally abutting relation, each of said wooden tiles comprising a plurality of slats assembled in a unitary block, said tiles being pre-sanded and including an upper surface coated with a finishing composition;
   (b) a layer of pressure-sensitive adhesive covering a portion of the upper surface of said tiles; and
   (c) a flexible carrier and protective sheet covering said adhesive and said tiles, said protective sheet being substantially co-extensive with said tiles, the adhesive bond formed between said sheet and said adhesive being stronger than the adhesive bond formed between said adhesive and said tiles, whereby said sheet is stripped from said tiles, both said sheet and said adhesive are removed therefrom, said cover comprising means for pulling the upper surfaces of all of said tiles into substantial alignment when said tiles are placed on an irregular surface.

2. A unitized floor panel in accordance with claim 1 wherein each of said wooden tiles comprises a plurality of parallel slats and wherein said tiles are arranged in a parquet fashion.

3. A unitized floor panel in accordance with claim 1 wherein said wooden tiles are comprised of a wood-plastic composite.

4. A unitized floor panel in accordance with claim 1 wherein said finishing composition is selected from the group consisting of veneers, shellacs, linseed oil, tung oil, polyurethanes and mixtures thereof.

5. A unitized floor panel in accordance with claim 1 wherein adjacent tiles of said plurality abut each other at butt joints.

6. A unitized floor panel in accordance with claim 5 wherein said floor panel comprises at least two rows and is foldable into a relatively compact size by folding at least one of said rows over another of said rows such that one portion of said protective sheet is folded onto a second portion of said protective sheet.

7. A unitized floor panel in accordance with claim 1 wherein said adhesive is an acrylic adhesive.

8. A unitized floor panel in accordance with claim 1 wherein said adhesive covers the entire upper surface of said tiles.

9. A unitized floor panel in accordance with claim 1 wherein said adhesive covers only a predetermined portion of the upper surface of said tiles.

10. A unitized floor panel in accordance with claim 9 wherein said predetermined portion represents a plurality of adhesive strips.

11. A unitized floor panel in accordance with claim 1 wherein said carrier and protective sheet comprises a transparent plastic film.

12. A unitized floor panel in accordance with claim 11 wherein said film possesses low flammability.

13. A unitized floor panel in accordance with claim 1 wherein said carrier and protective sheet comprises paper.

14. A unitized floor panel in accordance with claim 13 wherein said paper has an outer surface having a printed design, said printed design corresponding to the arrangement of said tiles to which said sheet is adhered.

15. A unitized floor panel in accordance with claim 13 wherein the outer surface of said paper is coated with a water repellent substance.

16. A unitized floor panel in accordance with claim 1 wherein said sheet comprises a tear tab to initiate removal of said sheet from said tiles.

17. A unitized floor panel in accordance with claim 1 wherein said sheet includes a plurality of spaced perforations.

18. A unitized floor panel in accordance with claim 1 wherein said sheet has a sufficiently high shear strength to support the weight of said tiles without failure.

19. A unitized floor panel in accordance with claim 1 wherein said panel is at least one foot wide and one foot long.

* * * * *

UNITED STATES PATENT AND TRADEMARK OFFICE
CERTIFICATE OF CORRECTION

PATENT NO. : 4,406,099

DATED : September 27,1983

INVENTOR(S) : Lawrence G. Barrett

It is certified that error appears in the above-identified patent and that said Letters Patent is hereby corrected as shown below:

In the Foreign References cited, , "21261912" should read -2126192- the first German reference.

In the Abstract, line 26, "layers" should read ---layer---.
line 26, after "sub-floor" insert ---,---.

In Column 3, line 62, "advangetages" should read ---advantages---.

In Column 4, lines 51-52, "polyeurethanes" should read ---polyurethanes---

In Column 6, line 63, "will sheets 16 or 18 have." should read ---sheets 16 or 18 will have.---.

In Column 7, line 8, before "enable" insert ---to---.
line 29, "affect" should read ---effect---.
line 59, "in an 8 hour per individual" should read ---in an 8 hour day per individual---.

In Column 9, line 10, delete "of" and substitute ---to--- therefor.
line 10, after "it" insert ---to---.

Signed and Sealed this

Twentieth Day of December 1983

[SEAL]

Attest:

GERALD J. MOSSINGHOFF

Attesting Officer

Commissioner of Patents and Trademarks